June 7, 1949.  D. PETERSON  2,472,229
MEASURING RULER
Filed April 24, 1947
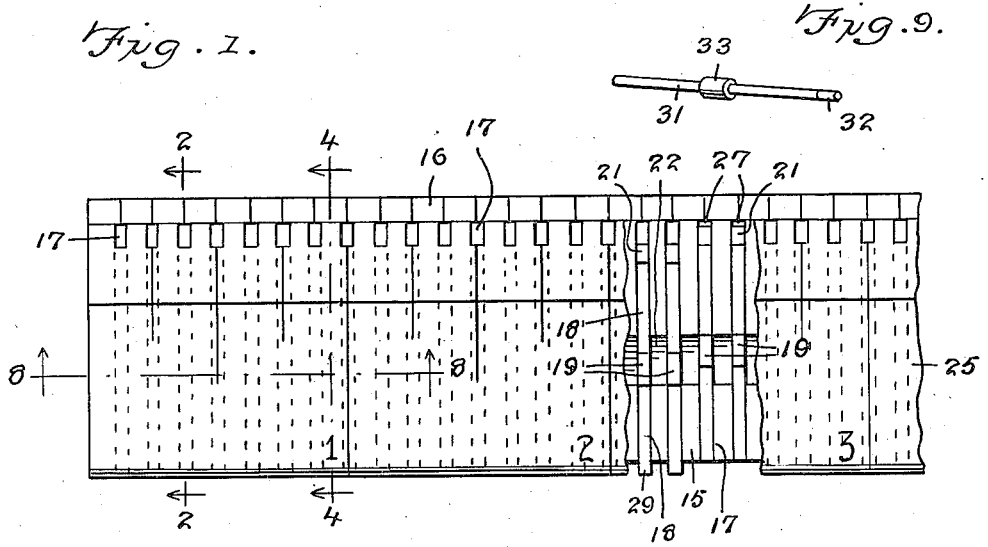
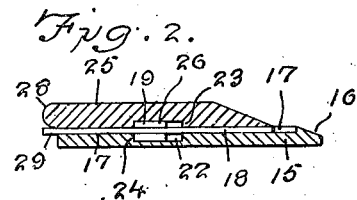
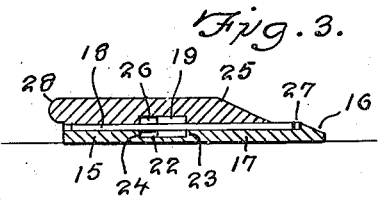
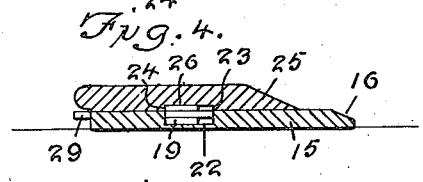
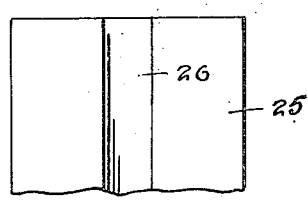
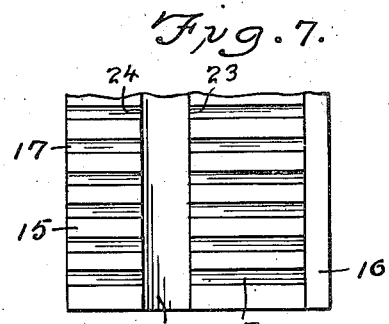
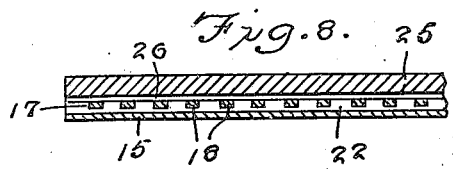
INVENTOR.
Dana Peterson
BY *Victor J. Evans & Co.*
ATTORNEYS Patented June 7, 1949

2,472,229

UNITED STATES PATENT OFFICE 2,472,229

MEASURING RULER

Dana Peterson, Oakland, Calif.

Application April 24, 1947, Serial No. 743,603

3 Claims. (Cl. 33—107)

This invention relates to measuring rulers.

It is an object of the present invention to provide a measuring ruler with different colored pegs which can be moved in and out to display the fractions of an inch on a ruler to which measurement is desired.

Other objects of the present invention are to provide a measuring ruler having movable elements for indicating fractions of an inch, which is of simple construction, inexpensive to manufacture and efficient in operation.

For a better understanding of the invention, reference may be had to the following detailed description taken in connection with the accompanying drawing, in which Fig. 1 is a fragmentary top plan view of the ruler with portions broken away to show the adjustable pegs within the ruler, Fig. 2 is a cross-sectional view taken on line 2—2 of Fig. 1 where the peg is in its unextended position, Fig. 3 is a cross-sectional view taken on the same line 2—2 of Fig. 1 after the peg has been extended, Fig. 4 is a cross-sectional view taken on line 4—4 of Fig. 1, Fig. 5 is a perspective view of one form of peg, Fig. 6 is a bottom plan view of the top part of the ruler, Fig. 7 is a top plan view of the bottom part of the ruler, Fig. 8 is a longitudinal cross-sectional view taken on line 8—8 of Fig. 1, Fig. 9 is a perspective view of a round peg.

Referring now to the figures, 15 represents the bottom part of the ruler having an inclined forward edge 16 and a plurality of longitudinally spaced recesses 17 through which can slide pegs 18 having stops 19 thereon. These pegs can be painted on their forward ends as indicated at 21 with different colors depending upon the fraction of an inch which the peg is to represent. For example, the pegs at the one half inch station can be colored red, the pegs at the one quarter inch station can be colored white and the pegs at the inch station can be colored blue. To receive the stops 19 there is provided a longitudinally extending recess 22 having forward and rearward side shoulders 23 and 24 with which the stop 19 will abut.

Fixed to the bottom part 15 is a top part 25 having a complementary recess 26 matching with the recess 22 for receiving the stop 19. This top part can be made secure to the bottom part by glue or other practical means.

The pegs are prevented from being extended into the ends of the slots at the inclined edge 16 by the stops 19 so that a space 27 is left into which a pencil point can be extended to return the peg to its retracted position shown in Figures 2 and 4. The rear portion of the top part 25 of the ruler is rounded as indicated at 28 and extends rearwardly of the rear edge of the bottom part 15 so that access can be had to rear end 29 of the peg.

It will be apparent that pegs 31 of round section as shown in Fig. 9 can be used in lieu of the pegs 18 of rectangular section. Also pegs of square section may be used. The pegs 31 may have a color mark 32 and a cylindrically shaped stop 33. It will be further apparent that the colored pegs will eliminate the necessity for the user to mark with a pencil the measurement which he desires to make from the ruler. The particular peg is simply extended and is effectively displayed.

While various changes may be made in the detail construction it shall be understood that such changes shall be within the spirit and scope of the present invention as defined by the appended claims.

I claim:

1. A measuring ruler having top and bottom parts, and pegs extending through the top and bottom parts at different longitudinal locations there along to indicate different measurements and slidable transversely of the ruler to display a given location and said bottom part having a plurality of grooves in which said pegs are slidable and a recess having stop shoulders, and stop means on each of the pegs for limiting the extent of movement of the peg.

2. A measuring ruler having top and bottom parts, and pegs extending through the top and bottom parts at different longitudinal locations there along to indicate different measurements and slidable transversely of the ruler to display a given location and said bottom part having a plurality of grooves in which said pegs are slidable and a recess having stop shoulders, and stop means on each of the pegs for limiting the extent of movement of the peg, said grooves ending on the bottom part at a location before reaching the measuring edge, and said stop means on the pegs limiting the movement of the peg to a location short of the end of the groove on the front edge and to provide space into which a finger nail can be extended to retract the peg.

3. A measuring ruler having top and bottom parts, and pegs extending through the top and bottom parts at different longitudinal locations there along to indicate different measurements and slidable transversely of the ruler to display a given location and said bottom part having a plurality of grooves in which said pegs are slidable and a recess having stop shoulders, and stop means on each of the pegs for limiting the extent of movement of the peg, and said stop part at its rear edge extending rearwardly of the rear edge of the bottom part to overhang the same, said pegs extending out of the rear edge of the bottom part and accessible from beneath the rear edge of the top part whereby the rear edge of the top part will protect the rear ends of the several pegs.

DANA PETERSON.

REFERENCES CITED

The following references are of record in the file of this patent:

UNITED STATES PATENTS

| Number | Name | Date |
| --- | --- | --- |
| 1,041,145 | Moss | Oct. 15, 1912 |